US011654605B2

(12) United States Patent
Baier et al.

(10) Patent No.: US 11,654,605 B2
(45) Date of Patent: May 23, 2023

(54) DIE HEAD AND PROCESS TO MANUFACTURE MULTILAYER TUBULAR FILM

(71) Applicant: HOSOKAWA ALPINE Aktiengesellschaft, Augsburg (DE)

(72) Inventors: Christian Baier, Neusäß (DE); Felix Grimm, Augsburg (DE); Michael Heinecker, Augsburg (DE); Joachim Libowski, Neusäß (DE)

(73) Assignee: HOSOKAWA ALPINE Aktiengesellschaft, Augsburg (DE)

( * ) Notice: Subject to any disclaimer, the term of this patent is extended or adjusted under 35 U.S.C. 154(b) by 229 days.

(21) Appl. No.: 16/600,260

(22) Filed: Oct. 11, 2019

(65) Prior Publication Data
US 2020/0114564 A1   Apr. 16, 2020

(30) Foreign Application Priority Data
Oct. 13, 2018   (DE) .............. 10 2018 008 127.4

(51) Int. Cl.
*B29C 48/335* (2019.01)
*B29C 48/70* (2019.01)
(Continued)

(52) U.S. Cl.
CPC ........... *B29C 48/338* (2019.02); *B29C 48/70* (2019.02); *B29C 48/0255* (2019.02); *B29C 48/3001* (2019.02)

(58) Field of Classification Search
CPC ..... B29C 48/0018; B29C 48/10; B29C 48/18; B29C 48/185; B29C 48/21;
(Continued)

(56) References Cited

U.S. PATENT DOCUMENTS 2,206,981 A    7/1940  Sturtevant
3,770,124 A    11/1973 Frangquist
(Continued)

FOREIGN PATENT DOCUMENTS

AT           304 058 B    12/1972
BR      102019026088 A2    7/2020
(Continued)

OTHER PUBLICATIONS

European Search Opinion for European Application No. 17 00 1985, filed Dec. 16, 2017, 15 pages (with machine language translation).
(Continued)

*Primary Examiner* — Xiao S Zhao
*Assistant Examiner* — Joseph S Leyson
(74) *Attorney, Agent, or Firm* — Paul D. Bianco; Katharine Davis Wong; Fleit Intellectual Property Law

(57) ABSTRACT

In the case of a die head and a process to produce multilayer tubular film made from thermoplastic polymers, the advantages of radial distributors and axial distributors should be combined. This is achieved in that at least one distributor is a plate distributor and at least one distributor is an axial distributor, whereby the plate distributor is located in an annular element of the axial distributor upstream of the melt merge zone to the ring-shaped die.

16 Claims, 3 Drawing Sheets

(51) Int. Cl.
 *B29C 48/30* (2019.01)
 *B29C 48/025* (2019.01)
(58) Field of Classification Search
 CPC .............. B29C 48/3001; B29C 48/32; B29C 48/335; B29C 48/3363; B29C 48/3366; B29C 48/338; B29C 48/49; B29C 48/70; B29C 48/71
 See application file for complete search history.

(56) References Cited

U.S. PATENT DOCUMENTS

| | | | |
|---|---|---|---|
| 3,809,515 A * | 5/1974 | Farrell | B29C 48/32 425/133.1 |
| 3,962,023 A | 6/1976 | Hofer | |
| 4,018,388 A | 4/1977 | Andrews | |
| 4,080,143 A | 3/1978 | Upmeier | |
| 4,133,488 A | 1/1979 | Heinemann | |
| 4,165,356 A | 8/1979 | Heider | |
| 4,602,743 A | 7/1986 | Nied | |
| RE33,085 E | 10/1989 | Petersen | |
| 5,076,776 A | 12/1991 | Yamada et al. | |
| 5,120,431 A | 6/1992 | Cordonnier | |
| 5,370,327 A | 12/1994 | Adamski | |
| 5,377,843 A | 1/1995 | Schumacher | |
| 5,377,931 A | 1/1995 | Dorfel | |
| 5,505,601 A | 4/1996 | Sensen et al. | |
| 5,544,841 A | 8/1996 | Didier et al. | |
| 5,673,870 A | 10/1997 | Fielding et al. | |
| 5,716,650 A * | 2/1998 | Mavridis | B29C 48/10 425/131.1 |
| 5,735,481 A | 4/1998 | Loosen | |
| 5,769,352 A | 6/1998 | Biagiotti | |
| 5,967,449 A | 10/1999 | Thomas et al. | |
| 5,992,773 A | 11/1999 | Schwechten | |
| 6,169,122 B1 * | 1/2001 | Blizard | B29C 48/13 521/79 |
| 6,189,821 B1 | 2/2001 | James | |
| 6,260,786 B1 | 7/2001 | Ueyama | |
| 6,398,139 B1 | 6/2002 | Nied | |
| 6,413,595 B1 | 7/2002 | Schirmer | |
| 6,543,710 B2 | 4/2003 | Hosokawa | |
| 6,783,344 B1 | 8/2004 | Rudolf | |
| 6,964,394 B1 | 11/2005 | Räty et al. | |
| 7,028,931 B2 | 4/2006 | Lin | |
| 7,036,763 B2 | 5/2006 | Böhm et al. | |
| 7,255,301 B2 | 8/2007 | Schmidt-Hebbel et al. | |
| 7,481,390 B2 | 1/2009 | Reinhold | |
| 7,811,073 B2 | 10/2010 | Alpine | |
| 7,850,102 B2 | 12/2010 | Meier et al. | |
| 7,913,851 B2 | 3/2011 | Chang | |
| 8,033,399 B2 | 10/2011 | Pistorius | |
| 8,039,105 B2 | 10/2011 | Meier et al. | |
| 8,231,007 B2 | 7/2012 | Wark | |
| 8,322,646 B2 | 12/2012 | Ueyama et al. | |
| 8,353,408 B2 | 1/2013 | Ito | |
| 8,714,359 B2 | 5/2014 | Aizawa | |
| 9,022,222 B2 | 5/2015 | Devroe | |
| 9,333,699 B2 | 5/2016 | Linkies | |
| 10,052,799 B2 | 8/2018 | Alpine | |
| 10,252,298 B2 | 4/2019 | Alpine | |
| 2002/0086071 A1 | 7/2002 | Rubhausen | |
| 2009/0104465 A1* | 4/2009 | Yanagida | B32B 27/34 428/473.5 |
| 2010/0173031 A1 | 7/2010 | Roberts et al. | |
| 2010/0320308 A1 | 12/2010 | Ueyama et al. | |
| 2011/0229722 A1* | 9/2011 | Rivett | B32B 7/12 428/412 |
| 2014/0367882 A1 | 12/2014 | Backmann et al. | |
| 2016/0257056 A1 | 9/2016 | Schumacher et al. | |
| 2017/0036386 A1 | 2/2017 | Planeta et al. | |
| 2020/0180890 A1 | 6/2020 | Durner et al. | |
| 2021/0221043 A1 | 7/2021 | Baier | |
| 2022/0105520 A1 | 4/2022 | Fuchs | |

FOREIGN PATENT DOCUMENTS

| | | |
|---|---|---|
| CA | 2191630 A1 | 6/1997 |
| CA | 3064404 A1 | 6/2020 |
| CH | 537800 | 6/1973 |
| CN | 85105182 A | 12/1986 |
| CN | 1500712 A | 6/2004 |
| CN | 101005936 A | 7/2007 |
| CN | 201280352 Y | 7/2009 |
| CN | 101987703 A | 3/2011 |
| CN | 102083722 A | 6/2011 |
| CN | 204 183 848 U | 3/2015 |
| CN | 205634333 U | 10/2016 |
| CN | 111302117 A | 6/2020 |
| DE | 291871 C | 5/1916 |
| DE | 22 50 151 A1 | 5/1974 |
| DE | 2555848 | 6/1977 |
| DE | 2919249 A1 | 11/1979 |
| DE | 31 40 294 A1 | 4/1983 |
| DE | 3140294 A1 | 4/1983 |
| DE | 3338138 A1 | 5/1985 |
| DE | 34 25 101 A1 | 1/1986 |
| DE | 4100338 A1 | 7/1992 |
| DE | 4140656 C1 | 9/1992 |
| DE | 4116964 A1 | 11/1992 |
| DE | 9214651 U1 | 2/1993 |
| DE | 4428249 A1 | 2/1995 |
| DE | 4405462 C1 | 4/1995 |
| DE | 295 05 311 U1 | 6/1995 |
| DE | 295 05 311 | 7/1995 |
| DE | 19613902 A1 | 10/1997 |
| DE | 197 28 382 A1 | 1/1999 |
| DE | 19755357 A1 | 6/1999 |
| DE | 198 40 344 A1 | 5/2000 |
| DE | 19840344 A1 | 5/2000 |
| DE | 10035894 A1 | 4/2001 |
| DE | 10029175 | 6/2001 |
| DE | 10059306 C1 | 5/2002 |
| DE | 20117248 U1 | 3/2003 |
| DE | 69715377 T2 | 6/2003 |
| DE | 10 2004 040 151 A1 | 3/2006 |
| DE | 10 2006 048 850 A1 | 4/2008 |
| DE | 20 2008 012076 U1 | 11/2008 |
| DE | 102009033171 A1 | 1/2011 |
| DE | 10 2009 046 593 A1 | 5/2011 |
| DE | 102009046585 A1 | 5/2011 |
| DE | 102011085735 A1 | 5/2013 |
| DE | 10 2013 016898 A1 | 4/2015 |
| DE | 102016012388 A1 | 4/2018 |
| DE | 112015001615 B4 | 4/2018 |
| DE | 102018009632 A1 | 6/2020 |
| EP | 0139279 A2 | 5/1985 |
| EP | 0471879 A1 | 2/1992 |
| EP | 1947043 A1 | 7/2008 |
| EP | 2261152 A1 | 12/2010 |
| EP | 2639038 A1 | 9/2013 |
| EP | 2873508 A1 | 5/2015 |
| EP | 3266586 A1 | 1/2018 |
| EP | 2326481 B1 | 5/2018 |
| EP | 3666700 A1 | 6/2020 |
| GB | 1331667 A | 9/1973 |
| GB | 2 253 807 A | 9/1992 |
| JP | S60 141229 U | 9/1985 |
| JP | 161257 | 6/1992 |
| JP | 15193 | 2/1994 |
| JP | 2001080801 A | 3/2001 |
| JP | 2009249178 A | 10/2009 |
| JP | 2013245105 A | 12/2013 |
| JP | 6916085 B2 | 8/2021 |
| RU | 2060219 C1 | 5/1996 |
| RU | 2 124 465 C1 | 1/1999 |
| RU | 2128617 C1 | 4/1999 |
| RU | 2737006 C1 | 11/2020 |
| SU | 1615113 A1 | 12/1990 |
| TW | M504084 U | 7/2015 |

(56) References Cited

FOREIGN PATENT DOCUMENTS

WO        94/12290 A1     6/1994
WO        2006018293 A1     2/2006

OTHER PUBLICATIONS

German Search Report for Application No. 10 2016 015 051.3, filed Dec. 16, 2016, 1 page.
European Search Report dated Apr. 26, 2018, for EP 17 00 1985, filed Dec. 16, 2017, 3 pages.
German Office Action dated Oct. 25, 2017 for Application No. 10 2016 015 051.3, 3 pages (with machine language translation).
Search Report for German Application No. 10 2016 015 051.3, filed Dec. 16, 2016.
Result of Examination Report for DE 10 2014 017 556.1 dated Nov. 28, 2014.
European Search Report and Search Opinion for EP15 00 3362 dated May 9, 2016.
Office Action for DE 10 2014 017 556.1 dated Jul. 7, 2015.
Search Report for German Application No. 10 2018 008 127.4 dated Oct. 13, 2018.
Ex parte Quayle Office Action dated Dec. 1, 2021 for U.S. Appl. No. 16/709,025.
Chinese Search Report dated Oct. 12, 2019 for Application No. 201910965569.4 with English translation.
European Search Report dated Feb. 18, 2020 for EP 19 00 0457.
Search Report from Chinese Patent Office dated Dec. 17, 2020, for Application No. CN201911262431.4 (11 pages).
Search Report dated Jun. 29, 2020, from Russian Patent Office for RU Appl. No. 2019140284 (with Eng translation).
Search Report from Taiwan Patent Office dated Oct. 24, 2020, for Application No. 108144774 (1 page).
Search Report from Chinese Patent Office for Application No. 201911262431.4, filed Dec. 11, 2019 (2 pages).
Notice of Allowance dated Feb. 18, 2022 for U.S. Appl. No. 16/709,025.

\* cited by examiner

DIE HEAD AND PROCESS TO MANUFACTURE MULTILAYER TUBULAR FILM

FIELD OF THE DISCLOSURE

The disclosure relates to a die head to manufacture multilayer tubular film from thermoplastic polymer as well as a process to manufacture a multilayer tubular film from thermoplastic polymer.

BACKGROUND

Industrially manufactured plastic film usually has a thickness of a few micrometres up to several hundred micrometres and consists of one to eleven separate layers whose individual thickness, generally speaking, is not less than one micrometre. Recent findings show that individual layers of less than one micrometre in thickness improve the properties of coextrusion film. Such nanolayer film is already known from the sector of cast extrusion. On the sector of blown film extrusion, there was up until now no extrusion die head available that was suitable for series production for the cost-effective manufacture of high-grade nanolayer film.

Die heads to manufacture tubular film are already known. Their job is to distribute the melt supplied to them from one or more extruders into an annular melt stream and to route it to the ring-shaped die of the die head.

A die head consists of a central mandrel surrounded by a housing. There are annular slits between the housing and the mandrel through which the melt is transported to the ring-shaped die. The die head is equipped with a melt feed system, a predistributor which divides the fed melt stream into several individual melt streams, one or more distributors which distribute the melt uniformly in the annular slits and to the ring-shaped die as well as the ring-shaped die itself from which the molten tube is discharged.

There are basically two different designs of distributors, i.e. the axial distributor in conical or cylindrical form and the radial distributor—also known as a plate distributor.

A frequently used die head concept is the axial spiral distributor, as disclosed in German patent DE 10 2004 151 A1. In this case, both distributor and melt merge zone are arranged in axial direction, i.e. in the direction of extrusion. With coextrusion die heads, the cylindrical or conical axial spiral distributors are arranged concentrically to each other and to the mandrel. These have spiral grooves which distribute the melt uniformly in the annular slits. The melt strands from the individual annular slits are merged upstream of the ring-shaped die and exit this as a molten tube. Axial spiral distributors are characterised by their pressure stability and dimensional accuracy.

Another die head concept is the radial or plate distributor. Here, distributor plates are arranged on top of one another around the mandrel of the die head. The radially arranged distributor usually exhibits the shape of a spiral. It distributes the melt strands and routes them into an annular slit between mandrel and distributor. The different melt streams are routed to the annular slit one after the other. This routes the melt to the ring-shaped die. The melt exits the ring-shaped die in the form of a molten tube.

The radial spiral distributor has a spiral geometry which is arranged vertically to the direction of extrusion in order to produce a seamless and homogeneous molten tube. By switching several radial spiral distributors in series, it is fairly easy to unite a number of melt flows to form one multilayer melt flow. A radial spiral distributor in the form of a radial plate die is known from German patent DE 10 059 306 C1 where the melt is introduced from the outside and flows radially to the inside.

A die head is known from patent EP 2 873 508 A1 which in addition to an axial spiral distributor, also has a downstream radial distributor.

By generating many nanolayers, the properties of the film produced can be improved in a targeted manner. Examples are the improved barrier effect or the better thermoforming properties. In order to also exploit the advantages of these so-called nanolayers on the sector of blown film extrusion, a number of possible solutions have already been suggested.

Patent EP 2 639 038 A1 discloses a die head with plate distributor to manufacture film with a nanolayer structure. This die head is made of machined and stacked metal sheets to produce thin layers.

By stacking many especially manufactured metal sheets, it is possible to obtain three-dimensional inside contours inexpensively. However, dictated by the thickness of the metal sheets, it is not possible in this way to produce a high-grade surface of the film in extrusion direction. Undercuts and dead spots in the melt channel cannot be avoided. Over and above this, thin metal sheets have a tendency to warp. Together with the normally high pressures which are known with the plate distributor to act in extrusion direction, this design concept nudges its limits with respect to output rate and service life.

The system has predistributor holes of equal width and identically thick metal sheets, which leads to an undefined layer thickness distribution in the manufactured multilayer tubular film.

In German patent DE 10 2016 012 388 A1, a die head and dedicated process to produce multilayer tubular film is disclosed which presents a radial distributor made up of several plates, whereby the plates are thin-layer distributor plates whose distribution plate outlet at the peripheral edge is a maximum of 0.75 mm in height.

In patent EP 2 326 481 B1, a die head with radial distributor and a dedicated process to produce multilayer tubular film is disclosed which combines distributor plates of customary thickness with micro-layer distributor plates. To this end, first of all the thin melt layers are merged one after the other and these are then combined with thicker layers. In the case of this die head, the distributor outlet of the micro-layer distributor is between 0.508 mm and 2.54 mm in height.

Because it allows small melt volumes and short flow paths, a plate distributor stack is extremely suitable for the production of thin melt layers. Thanks to the immediate amalgamation of the melt flows after exiting the distributor melt channel, the normal path through the merging zone common with axial distributors is not necessary. This means that sufficiently high flow rates can be realised even if the melt throughput is small. A disadvantage of plate distributor coextrusion is that the common flow path of the polymer melts is comparatively long. It is known that polymers can develop flow inhomogeneity if the common flow paths are long, and this ultimately has a negative influence on the layer thickness distribution. It is also known that if the common flow paths are long, sensitive polymers can become damaged by the associated thermal and material exchange processes. These effects occur primarily if the individual layers are not thick and they have large interfaces and long common flow paths.

SUMMARY OF THE DISCLOSURE

One aspect of the disclosure relates to a solution which combines the advantages of axial distributors and radial distributors in one die head.

In an embodiment, a die head includes distributors with at least one distributor being an axial distributor and at least one distributor being a plate distributor, whereby the plate distributor is located in an annular element of the axial distributor upstream of the melt merge zone to the ring-shaped die.

In accordance with the disclosure, a die head with axial distributor is provided as the basis. In this case, one or several melt channels are not fed with melt via an axial distributor but rather by a radial distributor—also called a plate distributor. To this end, one or several distributor plates are grouped together to form a plate distributor stack and integrated into the die head such that they feed the melt channel instead of the spiral of the axial distributor.

The layer structure in the plate distributor stack can be adapted regarding thickness and type of melt supplied to suit the specific application in hand. The plate distributor stack is fed from one or several extruders, preferably two extruders. For example, when feeding a multilayer plate distributor stack with two extruders, an alternating layer structure is achieved. The layer flows generated with the aid of the plate distributor stack are merged one after the other and are then subsequently merged in extrusion direction with the melt streams from the axial distributor. The merging of the melt streams can take place simultaneously or consecutively. They are then routed to the ring-shaped die. The melt is routed to the die head via one or more melt feed units.

In one design according to the disclosure, the height of every melt channel of the plate distributor is less than the width of every melt channel of the axial distributor.

The melt layers formed in the axial distributors can be of the same or different material. The layers can be of the same or different thickness. To this end, the melt is routed to the die head via one or more melt feed units.

The number of layers in the plate distributor can vary between 1 and 30 and more, whereas the number of layers in the axial distributor is between 1 and 11. Notwithstanding this, a higher number of layers can be selected. The individual layers from both distributors can comprise one material or different materials.

Dependent on the film being produced, the plate distributor stack can be located at the outside or inside melt channels or at channels in between. To this end, the corresponding annular element with axial spiral in the die head is replaced by a component with plate distributor. This leads to the formation of film structures where the inside nanolayer structure is either on the outside or the inside of the tubular film.

In one design according to the disclosure, the die head has two axial distributors between which a melt channel with plate distributor is located.

The die head can also be equipped with several plate distributor stacks. They are operated either in series or in parallel.

In series operation, several plate distributor stacks in extrusion direction are located downstream of a melt channel.

In parallel operation, plate distributor stacks are located at two or more melt channels.

Parallel operation can also be combined with series operation.

In another design according to the disclosure, an axial spiral distributor and a plate distributor stack are located one above the other, whereby they both discharge their melt into the same melt channel.

A plate distributor stack can also be located downstream of the zone where the melt channels merge and can discharge its melt directly upstream of the ring-shaped die into the melt stream flowing in extrusion direction.

The melt flows in the plate distributor stack from the predistributor to merge with the other melts in the melt channel.

It can be radial from the inside to the outside or from the outside to the inside.

For installation of the plate distributor stack in the die head, first of all the plate distributor plates are clamped to form a distributor plate stack by means of separable connection elements such as bolted connections. This stack is installed instead of an axial spiral in an annular element and is integrated concentrically into the die head.

One advantage of this solution is the comparatively simple integration into the existing and proven concept of the axial distributor die head, which makes it possible to transfer the well-known advantages such as the pressure stability of concentric axial distributors to the concept of radial distributors.

Thanks to the comparatively simple exchange of just a few components, existing axial distributor die heads can, for example, be supplemented or retrofitted with one or more layers from a plate distributor.

The annular element in which the plate stack is installed is in modular design and comprises a basic annular element, the plate distributor stack and a mounting ring.

Thanks to this modular design, the plate distributor stack, the predistributor and the melt merge zone between the predistributor and plate distributor stack can be easily exchanged and adapted to suit the required type of film regarding thickness, number and types of materials as well as the number of layers.

The melt streams from the plate distributor stack are first of all merged one after the other to form a single melt stream and then merged with the melt streams from the axial distributor. The melt streams can have a common or a multi-stage melt merge zone. This is located in flow direction as close as possible to the die head outlet, the ring-shaped die.

Long and shared flow paths of different polymer melts in contact with each other can lead to negative effects on the quality of the coextrusion film. Above all due to the high ratio of surface to volume intentionally selected with thin film, these layers can be susceptible to interface effects. By merging the melt streams in flow direction as late as possible, a material and thermal equilibrium of the layers can be minimised. This involves, for example a compact merging of the individual melt streams with the already developed thin-film block. In this way, it is possible to exploit a further advantage of axial distributor technology for thin-film technology.

The merged melt layers from the plate distributor stack can flow into the respective melt channel perpendicularly or at an acute angle. The angle is preferably between 20° and 45°. Ideally, the angle is between 30° and 40°.

The large surface of the melt streams in the plate distributor in relation to the volume benefits the thermal exchange between die head and melt and/or between the individual melt layers, respectively. Dependent on the selected processed polymer melts and the selected process parameters, an undesirable thermal transfer can complicate the processing of the polymers and diminish the quality of the film being produced. This can be prevented by means of systematic temperature control or a thermal insulation of the elements in the distributor.

In one design according to the disclosure, the distributor of the inside molten tube layer is located in the outside wall of the inside annular element, the mandrel, which delimits the inside melt channel. In another design according to the disclosure, the distributor of the outside molten tube layer is located in the inside wall of the outside annular element, the die head housing, which delimits the outside melt channel. The distributor can thereby be an axial distributor or a radial, i.e. plate, distributor.

Both designs can also be combined.

The axial distributor is preferably equipped with individual inverted spirals, i.e. the spiral is not located on the outside of the annual element but rather on the inside. A preferred design of the outside spiral in the housing wall is as an inverted spiral. This prevents the formation of spiral marks and thus increases the quality of the film.

In introducing the layers into the innermost tubular film layer, the plate distributor discharges into the innermost melt channel from the inside out. If on the contrary, the layers are introduced into the outside tubular film layer, the plate distributor discharges into the outermost melt channel from the outside in.

In another design according to the disclosure, the cross-sections in the plate distributor stack are selected such that each melt flow is subjected to a similarly high pressure drop in the intended operating condition. Due to the rheologically similar conditions that set in, a uniform layer distribution is achieved. In another case, different layer thicknesses can be produced in a targeted manner by specifying different pressure drops. The geometric adjustments can be made, for example, in the predistributor, in the feed from the predistributor to the plate distributor channels, the distributor geometry or the merging of the melt streams.

In a related process according to the disclosure, layers of a multilayer film tube made of thermoplastic polymer are manufactured both in an axial distributor and in a plate distributor which discharges its melt into the melt channel of the axial distributor.

The melt layers from an axial distributor are thereby combined in the die head with melt layers from a plate distributor.

The latter are merged one by one to form a layer structure in the downstream melt channel. This merged melt stream is then merged with the melt streams from the axial distributors. The melt streams from the plate distributors can also be placed direct on a melt stream from the axial distributor.

Die heads with several plate distributors in series or parallel operation are also possible.

In series operation, several plate distributor stacks are located on top of each other at a melt channel.

In parallel operation, plate distributor stacks are located at two or more melt channels.

Parallel operation can also be combined with series operation.

An axial spiral distributor and a plate distributor stack can also be located one above the other which discharge their melt into the same melt channel.

The combination of nanolayer technology with the advantages of blown film extrusion offers great potential for the cost-effective and resource-conserving production of film with improved properties and low thickness tolerance.

The die head concept proposed here bases on the proven design of the axial spiral distributor and thereby combines axial and radial designs in an effective way.

BRIEF DESCRIPTION OF THE DRAWINGS

Other details, features and advantages are also disclosed herein and from the following description of the associated drawings in which a preferred embodiment of is shown by way of example.

The drawings show.

DETAILED DESCRIPTION

Figure 1:
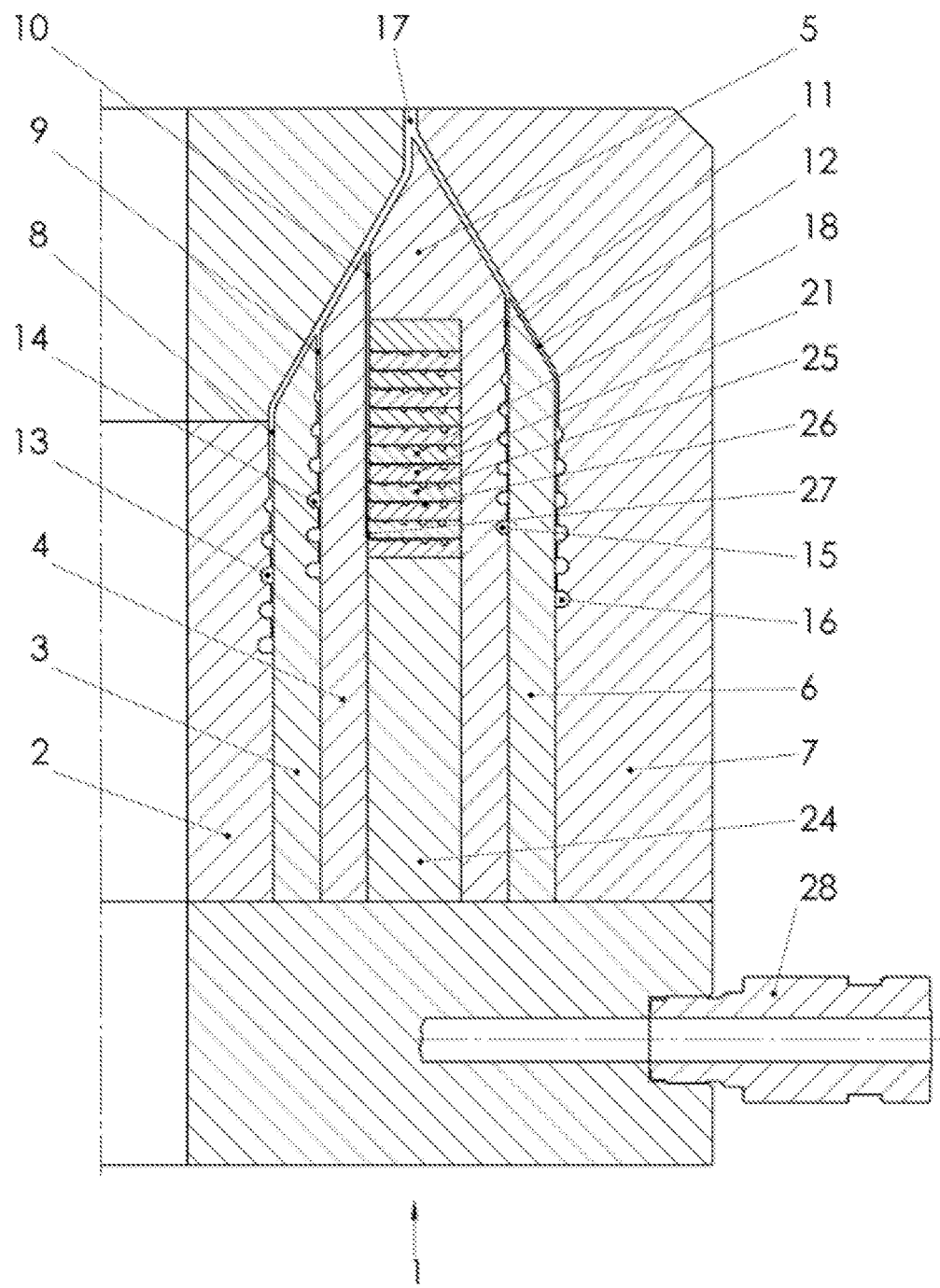
FIG. 1: A die head according to the disclosure.

In FIG. 1, a die head in a preferred embodiment is shown in section.

The die head (1) combines an axial distributor with a plate distributor. The die head (1) surrounds an inside cylindrical mandrel (2). The mandrel (2) in this example is surrounded by concentric annular elements (3, 4, 5, 6, 7), whereby the outermost annular element (7) simultaneously constitutes the housing. The mandrel (2) itself also constitutes an annular element. Between the mandrel (2) and the inside annular element (3), as well as between the individual annular elements are ring-shaped dies, the melt channels (8, 9, 10, 11, 12). The mandrel (2), the first (3) and the third annular element (5) all exhibit a spiral (13, 14, 15) on their outside cylindrical surface. The sixth annular element (7), the housing, exhibits a spiral (16) on its inside cylindrical surface. The depth of the spirals (13, 14, 15, 16) decreases towards the ring-shaped die (17). The second (4) and fourth annular element (6) have no spirals but rather smooth cylindrical surfaces. The third annular element (5) has a plate distributor (18). On its inside cylindrical surface, there is a recess to accommodate a plate distributor stack (21) and it has a mounting ring (24). The plate distributor stack (21) comprises several distributor plates (25) which constitute the plate distributor stack (21) and the melt feed units (not shown here). Plate distributor melt channels (26) are located between these. The plate distributor (18) has a melt feeder (not visible here), a spiral distributor, melt channels (26) and melt outlets (27). The distributor plates (25) are connected to each other by means of a bolted connection or another separable connection and are fixed on the mounting ring (24). The plate distributor stack (21) with mounting ring (24) is then installed in the die head (1) with the third annular element (5), the base annular element. The plate distributor stack (21) discharges its melt streams from the plate distributor melt channels (26) one by one into the melt channel (10). The melt channels (8, 9, 10, 11, 12) are united upstream of the ring-shaped die (17) to form an annular slit.

The melt is transported by several melt feed units (28) into the die head (1), and is then conveyed via different predistributors (not shown here) to the start of the spirals (13, 14, 15, 16) and the plate distributor (18).

The melt is distributed uniformly by the axial distributor, here an axial spiral distributor, over the circumference of the respective melt channels (8, 9, 11, 12) before being conveyed towards the ring-shaped die (17). Another melt stream is fed via a predistributor (not shown) to the plate distributor stack (21) and is distributed in the same such that it discharges as a uniform molten tube stream via the distributor outlets (27) into the melt channel (10). The plate distributor is thus located concentrically in the axial distributor. In the melt channel (10), the melt streams from the individual plate distributor melt channels (26) are united one after the other. This united melt stream is then united consecutively with the melt streams from the melt channels (8, 9, 11, 12) before being routed to the ring-shaped die (17) where the melt stream discharges as a multilayer molten tube.

Because the spiral discharge of the outside layers of the molten tube, i.e. the inside and outside layer, takes place towards the centre of the molten tube, which subsequently make contact with the melt of the other layers, a multilayer film can be produced without streaks and corrugations.

If die head for multilayer tubular film of over 5 thick layers is to be used, correspondingly more annular elements are located between the outside ring element and the mandrel. If a die head for multilayer tubular film of less than 5 thick layers is to be used, correspondingly less annular elements are located between the outside annular element and the mandrel.

The plate distributor can also be adapted regarding the number of layers by employing more or less plates.

Figure 2:
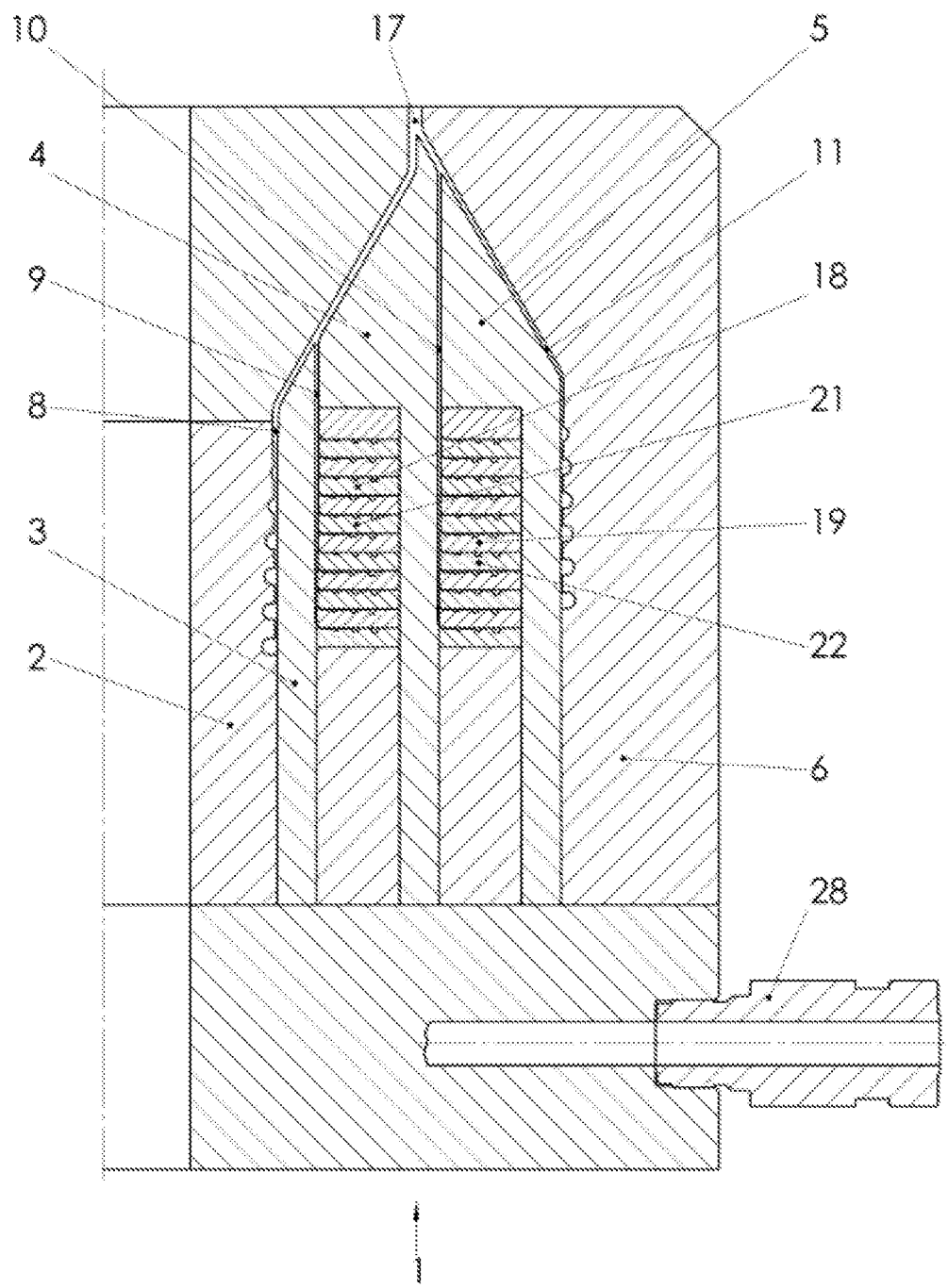
FIG. 2: A die head with plate distributor in parallel operation according to the disclosure.

FIG. 2 shows a die head (1) in parallel operation. In comparison with the die head in FIG. 1, this die head (1) has two plate distributors (18, 19). A plate distributor (18) is located in the annular element (4), the associated plate distributor stack (21) discharges the melt into the melt channel (9). The second plate distributor (19) is positioned in the annular element (5). The plate distributor stack (22) of the distributor (19) discharges the melt into the melt channel (10). This melt stream is then united consecutively with the melt streams from the other melt channels (8, 9, 11) before being routed to the ring-shaped die (17) in order to exit the die head (1) as a molten tube.

Figure 3:
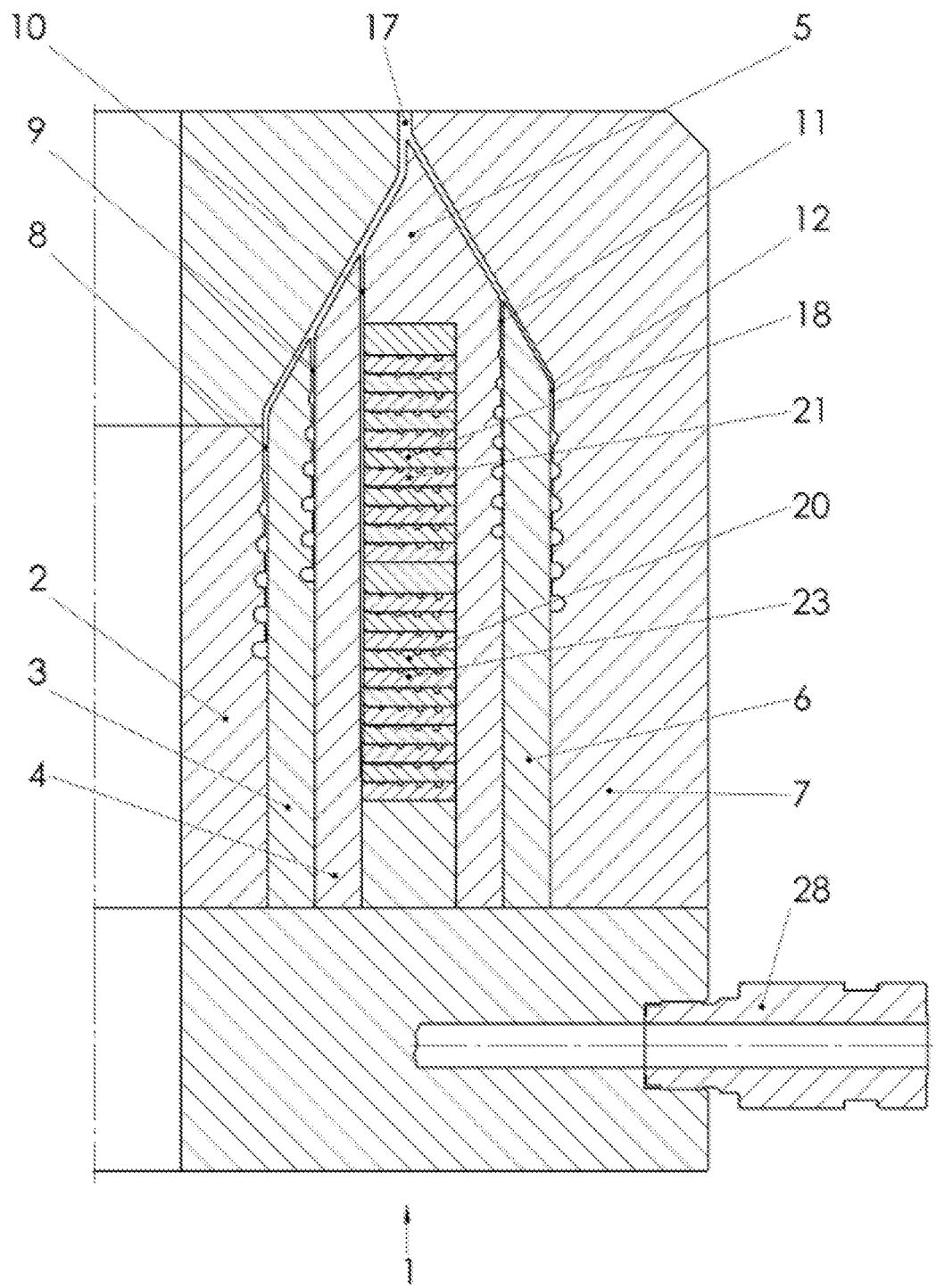
FIG. 3: A die head with plate distributor in series operation according to the disclosure.

FIG. 3 shows a die head (1) in series operation. It also has two plate distributors (18, 20). The plate distributors (18) and (20) are positioned on top of each other in the same annular element (5). Both plate distributor stacks (21) and (23) discharge their melt into the same melt channel (10). This united melt stream is then united consecutively with the melt streams from the melt channels (8, 9, 11, 12) before being routed to the ring-shaped die (17) in order to exit the die head (1) as a molten tube.

LEGEND

1 Die head
2 Mandrel
2, 3, 4, 5, 6, 7 Annular elements
8, 9, 10, 11, 12 Melt channels
13, 14, 15, 16 Spirals
17 Ring-shaped die
18, 19, 20 Plate distributors
21, 22, 23 Plate distributor stacks
24 Mounting ring
25 Distributor plates
26 Plate distributor melt channels
27 Plate distributor melt outlet
28 Melt feeder

The invention claimed is:

1. A die head for producing a multilayer tubular film from thermoplastic polymers, the die head comprising:
a mandrel surrounded by a plurality of annular elements;
at least one melt feeder;
a plurality of melt channels arranged concentrically around a central axis of the die head, wherein the plurality of melt channels are delimited by the mandrel and the plurality of annular elements;
a ring-shaped die into which the plurality of melt channels discharge; and
a plurality of distributors for distributing a melt from the at least one melt feeder to the ring-shaped die;
wherein at least one of the plurality of distributors is an axial distributor and at least one of the plurality of distributors is a plate distributor, the plate distributor having a plurality of distributor plates with plate distributor melt channels located in between and arranged in an annular element of the plurality of annular elements upstream of where the melt merges into the ring-shaped die and whereby the plate distributor is delimited in a radial direction on a first side by a respective melt channel to which the plate distributor discharges and on a second opposite side by the annular element of the plurality of annular elements.

2. The die head of claim 1, wherein the plurality of distributors includes plate distributors located at different melt channels of the plurality of melt channels.

3. The die head of claim 1, wherein the plurality of distributors includes plate distributors located at a same melt channel of the plurality of melt channels and configured either on top of or opposite each other.

4. The die head of claim 1, wherein the plurality of distributors includes plate distributors and axial distributors located at a same melt channel of the plurality of melt channels.

5. The die head of claim 1, wherein the annular element of the plurality of annular elements with the plate distributor arranged in the annular element of the plurality of annular elements is designed in a modular way to comprise a base annular element, a plate distributor stack, and a mounting ring.

6. The die head of claim 1, configured such that merging of the melt from the plate distributor melt channels into the plurality of melt channels takes place at an acute angle.

7. The die head of claim 1, wherein the axial distributor or plate distributor of an outside melt channel of the plurality of melt channels is located at an inside wall of a housing.

8. The die head of claim 1, configured such that a layer thickness distribution in the multilayer tubular film produced is set as a function of pressure drops in the axial distributor and in the plate distributor.

9. The die head of claim 8, wherein the pressure drops are set across cross-sections in the axial distributor and in the plate distributor.

10. The die head of claim 9, configured such that adaptation of the cross-sections of the axial distributor and the plate distributor for thickness and type of melt takes place in at least one of a predistributor, a feed line from the predistributor to axial and radial distribution channels of the respective axial and plate distributors, a distribution geometry, and a merging of melt streams.

11. The die head of claim 1, wherein the axial distributor or the plate distributor of an inside melt channel of the plurality of melt channels is located at an outside wall of a mandrel of the die head.

12. The die head of claim 1, wherein the axial distributor comprises at least one spiral on an outside cylindrical surface or on an inside cylindrical surface of at least one annular element of the plurality of annular elements.

13. A method for production of multilayer tubular film made from thermoplastic polymers in a blown film line, the method comprising providing the die head of claim 1, forming at least one of the layers of the multilayer tubular film from one or several layers in an axial distributor of the die head of claim 1 and from one or more layers in a plate distributor of the die head of claim 1, and discharging melt from the plate distributor into the axial distributor.

14. The method of claim 13, further comprising operating the plurality of distributor plates in parallel mode.

15. The method of claim 13, further comprising operating the plurality of distributor plates in series mode.

16. The method of claim 13, further comprising operating the plurality of distributor plates in a combination of parallel and series mode.

\* \* \* \* \*